May 1, 1934.  R. B. GRAY ET AL  1,956,676

DOWN STALK LIFTING ATTACHMENT FOR HARVESTING MACHINES

Filed Oct. 17, 1933

Inventors
Roy B. Gray
Leonard G. Schoenleber
per
Thomas
Attorney

Patented May 1, 1934

1,956,676

UNITED STATES PATENT OFFICE 1,956,676

DOWN-STALK LIFTING ATTACHMENT FOR HARVESTING MACHINES

Roy B. Gray, Washington, D. C., and Leonard G. Schoenleber, Ames, Iowa, dedicated to the free use of the Public of the United States of America Application October 17, 1933, Serial No. 693,964

6 Claims. (Cl. 56—119)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to us of any royalty thereon.

We hereby dedicate the invention herein described to the free use of the public in the territory of the United States of America to take effect upon the granting of a patent to us.

Our invention relates to an attachment to a mechanical corn picker, corn binder, corn combine, sugar cane harvester or other machines of similar type for harvesting standing row-crops such as corn, sugar cane, sorghum, and the like.

Machines now used for harvesting crops of this type are adapted only for gathering and harvesting such of the crop as is standing upright in the row but are not adapted to gather in and harvest stalks which have been broken down or have fallen over and are down upon the ground, a large percentage of such fallen or down stalks being missed and not harvested.

In the control of certain insect pests, particularly the European corn borer, cutting off the stalks at the surface of the ground, in harvesting the crop, together with complete and clean harvesting of the entire crop results in the removal from the field of most of the corn borers in the stalks and is one of the most important measures for the control of this pest. The failure of existing machines to pick up and gather the fallen or down stalks, not only represents a considerable loss in fodder, as well as grain, particularly in adverse seasons, but in addition, stalks infested by borers and left on the field provide the shelter required by the insects to carry them through the winter and render ineffective any attempts to control the pest by other means.

We overcome these objections by providing an attachment for corn binders and harvesting machines hereinafter more fully described, adapted to pick up from the ground any fallen or down stalks and gather them inward toward the crop row and raise them upwardly and rearwardly with respect to the harvesting machine, and bring them within the reach and range of the gathering mechanism of the harvesting machine. We accomplish this object by means of long slender preferably elastic, metal fingers attached to links of an endless chain, carried on sprocket wheels mounted on a divider board of a corn binder or other row crop gathering or harvesting machine and operated in such a manner that the outer ends of the fingers sweep the surface of the ground transversely of the row in front of the snout or point of the divider board, and pick up and gather any fallen or down stalks lying upon the ground, carry them inward toward the crop row being harvested, raise them from the ground and bring them within the reach and range of the gathering chains of the binder, so that they are harvested along with the standing crop, in the conventional manner.

The above and other advantages of our invention are brought out more specifically in the detailed description of the present embodiment of the invention, which follows, the same being illustrated in the accompanying drawing, wherein Figure 1 is a perspective front view of the attachment as applied to a corn binder of conventional type;

Similar numerals refer to similar parts throughout the several views.

Figures 1 and 2, show the attachment mounted upon the left divider board 1 of a corn binder. Figure 3 is shown, for compactness, with only one finger mounted on the endless chain.

Figures 1, 2:
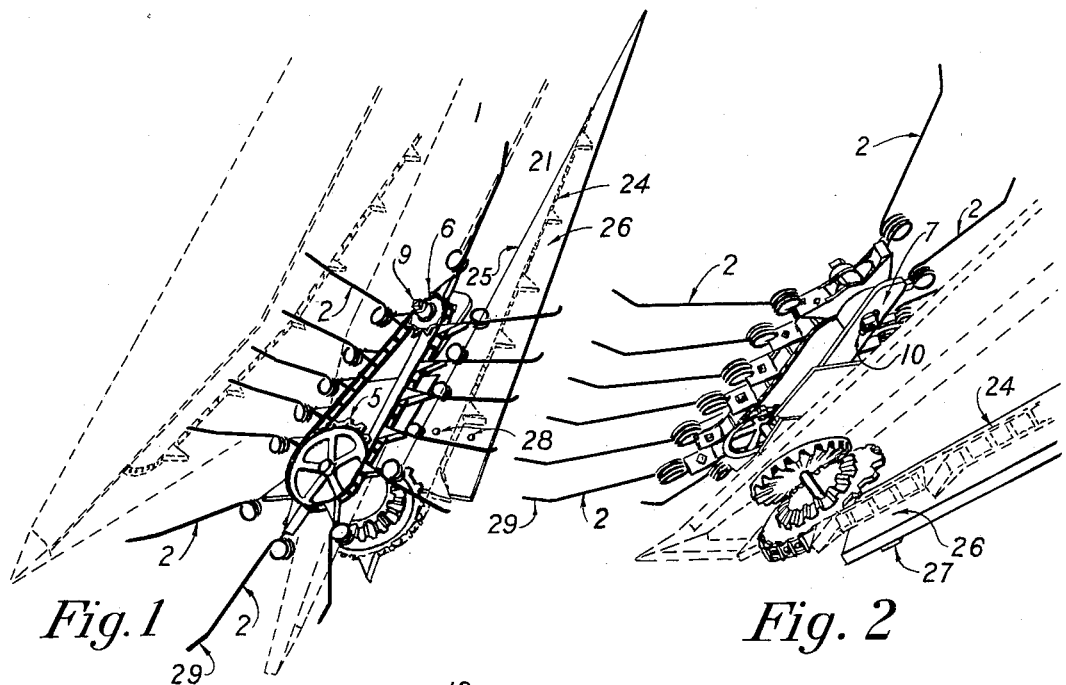
Figure 2 is a perspective side and rear view from a low position.
Figure 3:
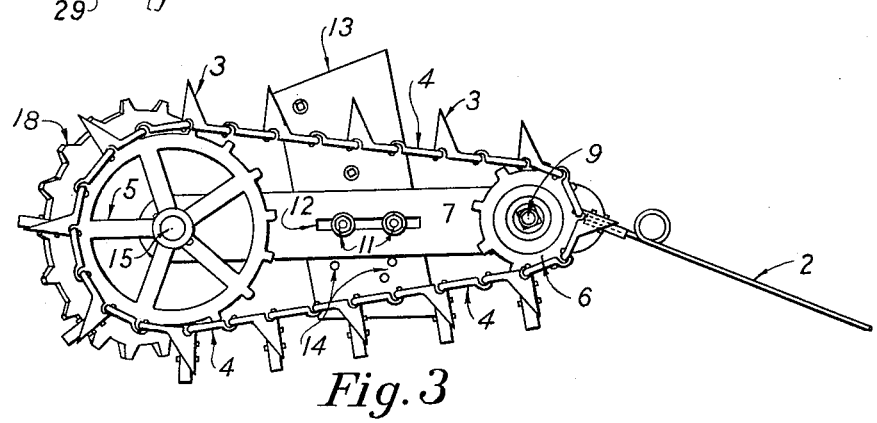
Figure 3 is a plan view of the attachment.
Figure 4:
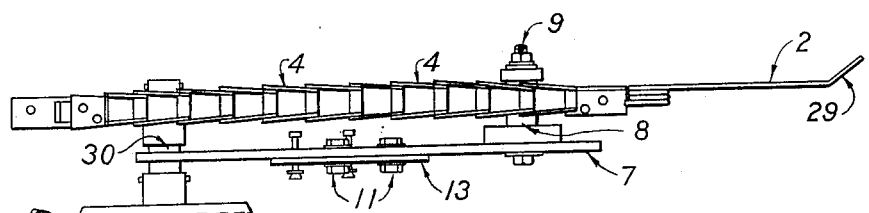
Figure 4 is a side view of the attachment.

A series of flexible elastic metal fingers 2, are secured to lugs 3 on links of an endless chain 4, which operates on a driving sprocket wheel 5 and an idler sprocket wheel 6. Sprocket wheels 5 and 6 are rotatably mounted on an adjustable bracket 7. Idler sprocket 6 revolves on a flanged stud 8, which is adjustably secured to bracket 7 by means of bolt 9 extending through stud 8 and a slotted opening 10 in bracket 7. Bracket 7 is adjustably secured, by means of bolts 11 and slot 12, to plate 13, which is mounted upon and secured to the upper surface of divider board 1 by means of suitable fastenings (not shown) of conventional type. Plate 13 is provided with a plurality of holes 14, adapted to receive bolts 11, said holes being so located as to permit of mounting bracket 7 at any one of several different angles. Driving sprocket 5 is carried on and suitably secured to the upper end of a shaft 15, journaled in a suitable bearing 30 in lower end of bracket 7, and extending down through divider board 1. A bevel gear 16 is mounted upon and secured to shaft 15 immediately below divider board 1, and meshes with a bevel pinion 17 carried on the upper face of an annular sprocket wheel 18.

The lower end of shaft 15 extends down through the central opening in sprocket wheel 18 and is journaled in a bearing 19 at one side of a bearing member 20, which also provides a bearing for the annular sprocket wheel 18 and which is secured to the chain board 21 of the binder by means of bolt 22. A thrust collar 23 secured to lower end of shaft 15 bears against the lower end of bearing 19, absorbing the thrust set up by the bevel gears and maintaining the gears in correct mesh.

Sprocket wheel 18 replaces a sprocket wheel (not shown) which normally carries the lower end of gathering chain 24 of the binder. Sprocket wheel 18 is of larger diameter than the sprocket wheel which it replaces, but is so located on the chain board 21 as to cause the inner or working side (not shown) of chain 24 to travel in its normal path, while the outer or slack side extends out beyond the outer edge 25 of chain board 21. A chain board extension 26 is provided to support slack side of chain 24 and is secured to chain board 21 at its lower end by means of brace 27 and bolts 28 and at its upper end by means of fastenings (not shown) of conventional type.

In operation, chain 4, carrying the flexible metallic fingers 2, is driven through binder chain 24, sprocket wheel 18, bevel gears 17 and 16, shaft 15 and driving sprocket wheel 5. The position of bracket 7 may be adjusted longitudinally, by means of bolts 11 and slot 12 so as to cause the tips of elastic metal fingers 2 to sweep within any desired distance above the ground surface at the lowest point in their travel.

As the binder moves forward, gathering in and binding the crop standing in the row, the fingers sweep close to the ground in a direction transverse to the row and pick up and raise any down stalks encountered and swing them over toward and into the crop row so that they are gathered and harvested by the binder along with the standing stalks. The ratio of the bevel gears and sizes of sprocket wheels are such as to cause chain 4 and fingers 2 to move at a speed slightly faster than the rate of forward movement of the binder. Bracket 7 is mounted obliquely with respect to the gathering chain, so that as the fingers travel upward, they are stripped or withdrawn from the gathered stalks. The outer ends, or tips 29 of the fingers are curved upward slightly to prevent the ends from digging into the ground, in case of accidental contact with the same, and also to reduce any tendency of stalks picked up to slip off from the fingers. The angle which bracket 7 forms with the gathering chain 24, may be varied over a considerable range, so as to cause fingers 2 to strip effectively from the gathered stalks.

While flexible elastic fingers with curved ends secured to lugs on links of an endless chain are shown in the drawing, our invention may also be practiced with rigid fingers or arms having either straight or curved ends. It may also be practiced with either straight or curved, flexible, or rigid fingers secured to a rotating disc and extending radially therefrom, said rotating disc replacing driving sprocket wheel 5.

We claim as our invention:

1. An attachment for a row crop harvesting machine for the purpose of picking up and lifting into the throat of the harvesting machine fallen stalks of the crop, comprising a driving sprocket wheel, an idler sprocket wheel, an endless chain carried upon said sprocket wheels, lugs on links of said chain, a plurality of flexible resilient fingers having curved outer ends secured at their inner ends to said lugs and extending perpendicularly outward from said chain, a bracket having at its lower end a bearing, with said idler sprocket wheel rotatably and adjustably secured to the upper end of said bracket, a plate adapted to be secured to a divider board of the harvesting machine, means for adjustably securing said bracket to said plate, a shaft carried in and rotating freely in said bearing, with said driving sprocket mounted upon and secured to the upper end of said shaft, means for driving said shaft, sprocket wheels and endless chain through means of the gathering chain of the harvesting machine, with said sprocket wheels, endless chain and fingers so positioned and driven in such direction as to cause the curved outer ends of said fingers to move along a curved path extending across the path of the harvesting machine close to the surface of the ground immediately in front of the point of the divider board and then curving obliquely upward to a point above the throat of the harvesting machine and then diverging outward away from the harvesting machine throat so as to cause said fingers to be withdrawn from the stalks drawn into the throat of the harvesting machine by the movement of the gathering chains of said machine.

2. In an attachment for a row crop harvesting machine, means for picking up and lifting within reach of the gathering mechanism of the machine fallen stalks of the crop, comprising a plate adapted to be secured to a divider board of the harvesting machine, a plurality of holes in said plate adapted to receive bolts, a bracket having at its lower end a bearing adapted to receive a shaft, and having at its middle portion a longitudinal slot, bolts extending through said slot and through selected holes in said plate for adjustably securing said bracket to said plate, a shaft carried in and rotating freely in said bearing on said bracket, a driving sprocket wheel mounted on and secured to the upper end of said shaft, an idler sprocket wheel rotatably secured to the upper end of said bracket, means for adjusting the position of said idler sprocket wheel on said bracket, an endless chain mounted on and extending around said sprocket wheels; lugs on the links of said chain, a plurality of flexible resilient fingers having curved outer ends and secured at their inner ends to said lugs and extending perpendicularly outward from said chain, means for driving said shaft, driving sprocket wheel and endless chain from the gathering chain of the harvesting machine, with said sprocket wheels so positioned and driven in such direction as to cause the curved outer ends of said fingers to move horizontally inward across the path of the harvesting machine, close to the surface of the ground immediately in front of the point of the divider board, then obliquely upward and rearward to a point above the throat of the harvesting machine then obliquely outward away from said throat, a bevel gear mounted on and secured to said shaft, an annular sprocket wheel adapted to engage a gathering chain of the harvesting machine and to replace an idler sprocket wheel normally carrying the lower end of said gathering chain, said annular sprocket wheel having on its upper face a bevel pinion meshing with said bevel gear, a bearing member, having a bearing adapted to receive the lower end of said shaft, having on its upper end a bearing adapted to receive said annular sprocket, means for securing said bearing member to a chain board of the harvesting machine, a collar on said shaft adapted to hold said bevel gear and said bevel pinion in correct mesh.

3. In an attachment for a row crop harvesting machine, means for picking up and lifting into the throat of the harvesting machine fallen stalks of the crop, comprising a plurality of flexible resilient fingers having curved outer ends, means for moving said fingers along a curved path close to the surface of the ground extending across the path of the harvesting machine immediately in front of the point of a divider board of the machine then obliquely upward to a point above the throat of the harvesting machine and then diverging obliquely outward away from the harvesting machine throat.

4. In an attachment for a row crop harvesting machine, means for picking up and lifting into the throat of the harvesting machine fallen stalks of the crop comprising a plurality of flexible resilient fingers having curved outer ends, means for moving said fingers along a curved path close to the surface of the ground extending across the path of the harvesting machine immediately in front of the point of a divider board of the machine then obliquely upward to a point above the throat of the harvesting machine and then diverging obliquely outward away from the harvesting machine throat, said means for moving said fingers comprising a driving sprocket wheel, a driven sprocket wheel, an endless chain carried on said sprocket wheels, lugs on links of said chain, means for securing said fingers to said lugs, a plate adapted to be secured to a divider board of the harvesting machine, means for securing said plate to the divider board, a bracket adapted to be adjustably secured to said plate and having at its lower end a bearing, means for adjustably securing said bracket to said plate, a shaft extending through and revolving freely in said bearing and having said driving sprocket mounted on and secured to its upper end, a bevel gear mounted on and secured to said shaft, an annular sprocket wheel adapted to engage a gathering chain of the harvesting machine and to replace an idler sprocket wheel normally carrying the lower end of said gathering chain and having on its upper face a bevel pinion meshing with said bevel gear, a bearing member having on its upper portion a bearing adapted to receive said annular sprocket wheel and also having a bearing adapted to receive the lower end of said shaft, means for securing said bearing member to a chain board of the harvesting machine, and a collar on said shaft adapted to hold said bevel gear and said bevel pinion in correct mesh.

5. In a row crop harvesting machine having a divider board, an attachment for picking up and placing into the throat of the harvesting machine fallen stalks of the crop, comprising a plurality of flexible, resilient fingers having curved outer ends, and means to move said fingers in spaced relationship with each other in a substantially circular course obliquely to the ground, said course being close to the ground in front of the divider board of the harvesting machine and then rising obliquely above the throat of the harvesting machine and then diverging obliquely outward away from the harvesting machine throat.

6. An attachment for a row crop harvesting machine for the purpose of picking up and lifting into the throat of the harvesting machine fallen stalks of the crop, comprising a driving sprocket wheel, an idler sprocket wheel, an endless chain carried upon said sprocket wheels, lugs on links of said chain, a plurality of fingers secured at their inner ends to said lugs and extending perpendicularly outward from said chain, a bracket having at its lower end a bearing, with said idler sprocket wheel rotatably and adjustably secured to the upper end of said bracket, a plate adapted to be secured to a divider board of the harvesting machine, means for adjustably securing said bracket to said plate, a shaft carried in and rotating freely in said bearing, with said driving sprocket mounted upon and secured to the upper end of said shaft, means for driving said shaft, sprocket wheels and endless chain through means of the gathering chain of the harvesting machine, with said sprocket wheels, endless chain and fingers so positioned and driven in such direction as to cause the outer ends of said fingers to move along a curved path extending across the path of the harvesting machine close to the surface of the ground immediately in front of the point of the divider board and then curving obliquely upward to a point above the throat of the harvesting machine and then diverging outward away from the harvesting machine throat so as to cause said fingers to be withdrawn from the stalks drawn into the throat of the harvesting machine by the movement of the gathering chains of said machine.

ROY B. GRAY.
LEONARD G. SCHOENLEBER.